Oct. 20, 1936.                F. A. BEAN                2,058,125
                    APPARATUS FOR UNLOADING CARS
                 Filed April 26, 1934        4 Sheets-Sheet 1
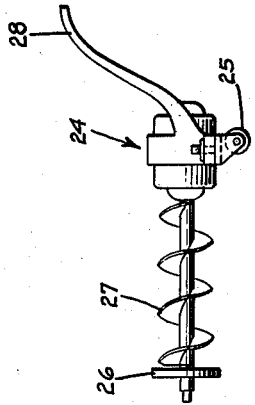
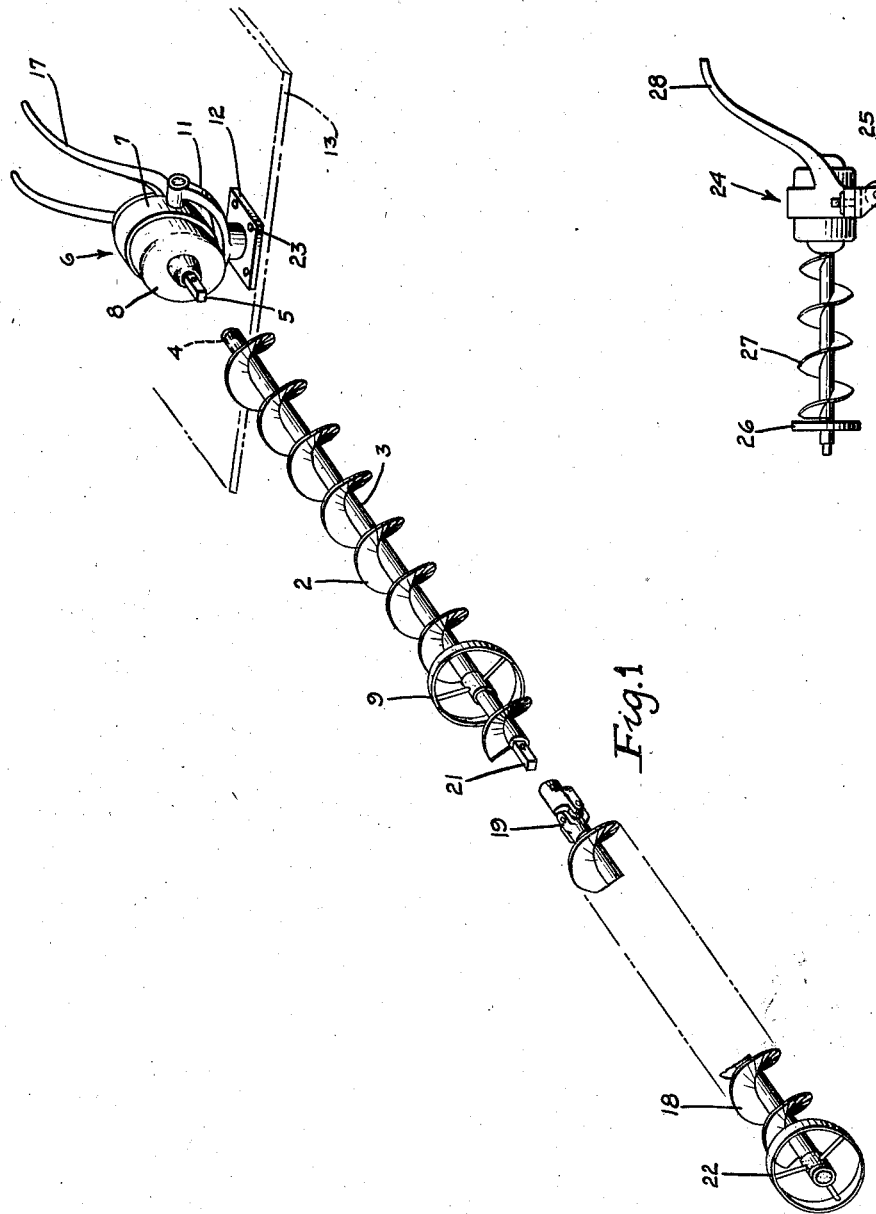
INVENTOR
FRANCIS A. BEAN
BY
   ATTORNEYS Oct. 20, 1936.  F. A. BEAN  2,058,125
APPARATUS FOR UNLOADING CARS
Filed April 26, 1934  4 Sheets-Sheet 2
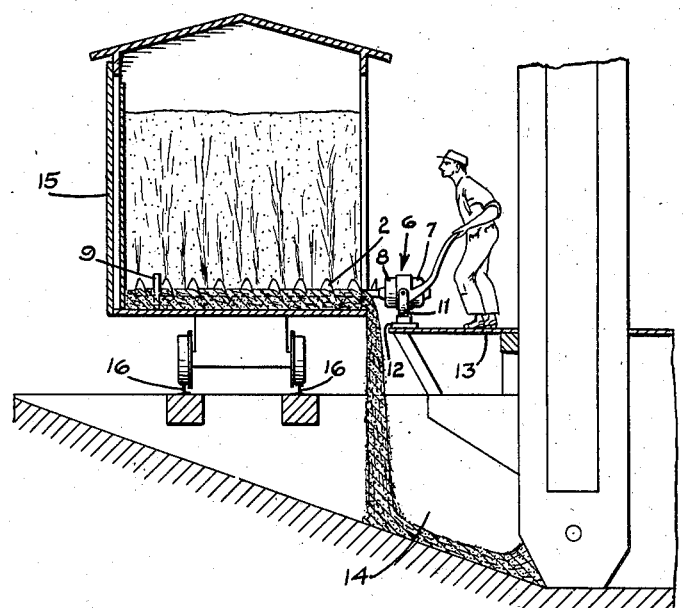
Fig.2
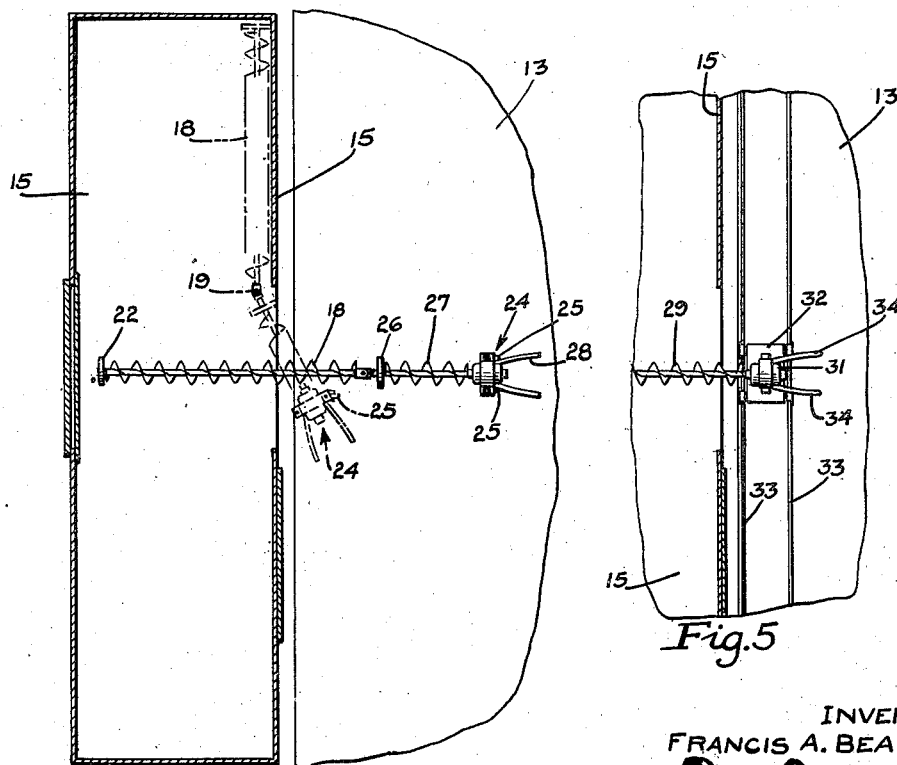
Fig.4
Fig.5
INVENTOR
FRANCIS A. BEAN
BY
ATTORNEYS Oct. 20, 1936.   F. A. BEAN   2,058,125
APPARATUS FOR UNLOADING CARS
Filed April 26, 1934   4 Sheets-Sheet 3

INVENTOR
FRANCIS A. BEAN
BY
ATTORNEYS

Oct. 20, 1936.  F. A. BEAN  2,058,125
APPARATUS FOR UNLOADING CARS
Filed April 26, 1934  4 Sheets-Sheet 4
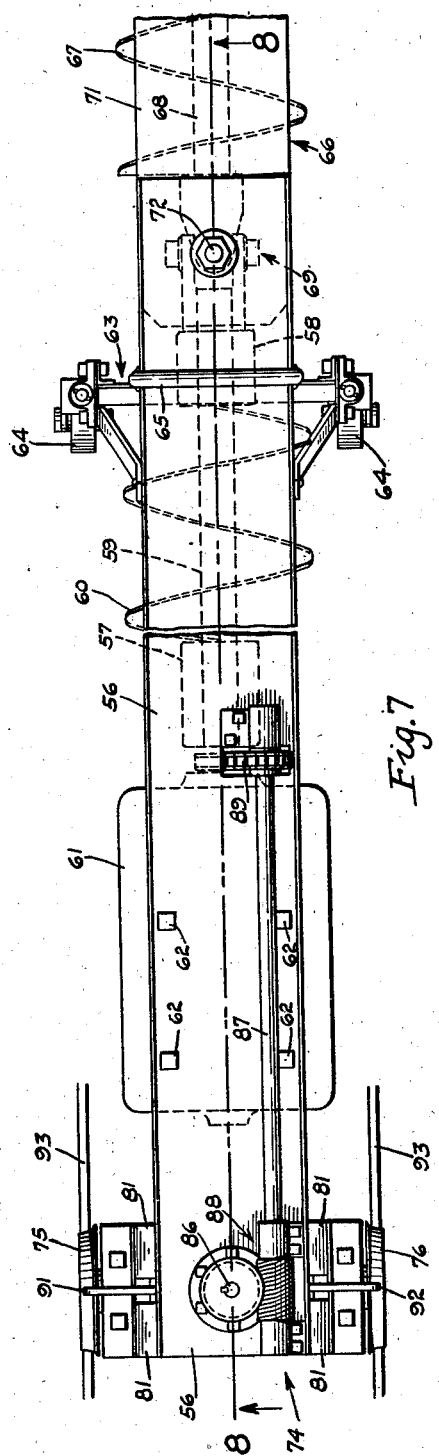
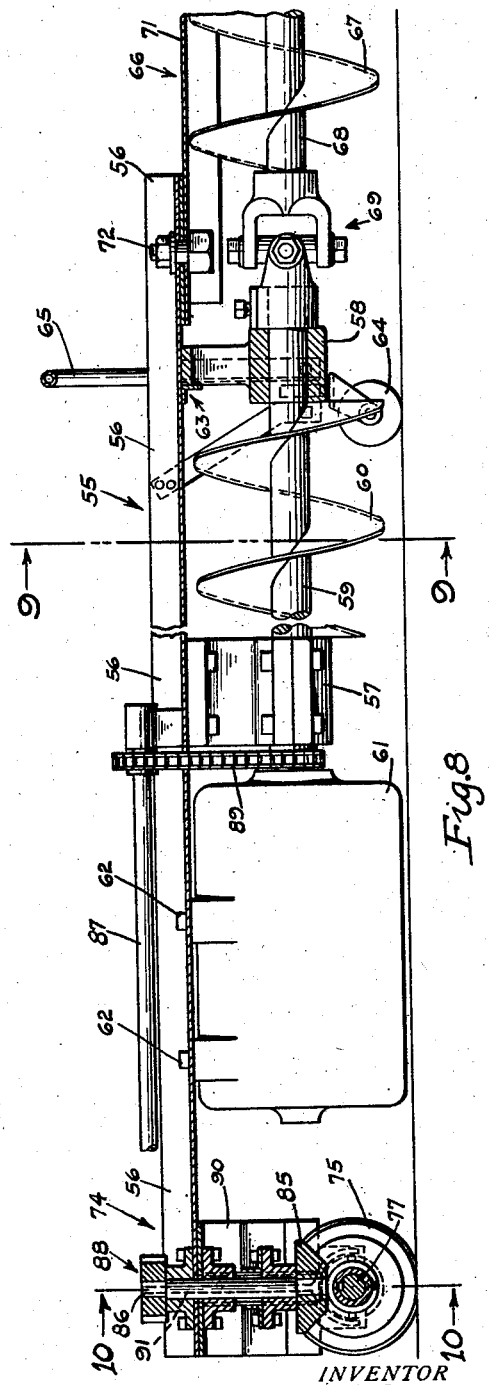
INVENTOR
FRANCIS A. BEAN
BY
ATTORNEYS Patented Oct. 20, 1936

2,058,125

UNITED STATES PATENT OFFICE 2,058,125

APPARATUS FOR UNLOADING CARS

Francis A. Bean, Minneapolis, Minn., assignor to International Milling Company, Minneapolis, Minn., a corporation of Delaware Application April 26, 1934, Serial No. 722,524

4 Claims. (Cl. 198—213)

This invention relates to an improved apparatus for conveying bulk material, of the general character disclosed in my patent No. 2,037,959, but which is more particularly adapted for quickly unloading or discharging bulk grain, and the like, from freight cars or bins.

The invention contemplates provision of a new and novel apparatus which is particularly applicable for use at grain terminals and elevators to unload bulk material from freight cars, and an object of the invention is to provide such an apparatus of simple and inexpensive construction which may be conveniently moved about from place to place by a workman, and is so constructed that it may readily be inserted or projected into a loaded freight car, in direct contact with the grain contained therein, whereby when operated, the grain will be quickly discharged therefrom.

A further object of the invention is to provide an improved portable apparatus for unloading bulk material from freight cars, and the like, which comprises a single open conveyer screw having a power device, such as a motor, rigidly, but detachably connected to one end thereof, and said power device being supported upon a swivel base and having means whereby a workman may conveniently manipulate it to thereby oscillate the conveyer screw, either horizontally or vertically, about said base, to thereby move it into direct contact with the material to be moved.

A further object resides in the provision of a portably conveying apparatus comprising an open conveyer screw mounted upon suitable carrying wheels, certain of which are power driven, whereby the apparatus may be conveniently transported by power from one place to another, and in either direction.

Other objects of the invention reside in the provision of means whereby an auxiliary conveyer screw may be coupled directly to the main conveyer screw for direct rotation therewith, and whereby the conveyer may be extended into the remote corners of a freight car or bin; in the novel arrangement of the rails or tracks upon which the power driven wheels of the apparatus travel, and whereby the opposite or leading end of the apparatus may be conveniently guided through the open door of a freight car or a bin into direct contact with the material contained therein, said rails being so arranged that the conveyer may be extended into either end of the car; and, in the provision of a portable power operated conveying apparatus having one end supported upon suitable swivel castors, and its opposite end upon a suitable power operated truck.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a perspective view showing the invention in its simplest form;

Figure 2 is a vertical sectional view showing the conveyer screw extended into a freight car to remove grain therefrom;

Figure 3 is a view showing the power device of the conveyer mounted upon suitable castors whereby it may more readily be moved about upon the station platform;

Figure 4 is a plan view of the conveyer illustrated in Figure 3, and showing an auxiliary conveyer coupled thereto and having one end positioned in a freight car;

Figure 5 is a plan view showing a conveyer unit similar to the one shown in Figure 1, but wherein the power device is mounted upon a small carriage adapted to travel on tracks or rails shown arranged in parallel relation to the freight car;

Figure 7 is a plan view of one of the conveyer units shown in Figure 6;

Figure 8 is a longitudinal sectional view on the line 8—8 of Figure 7;

Figures 6, 9, 10:
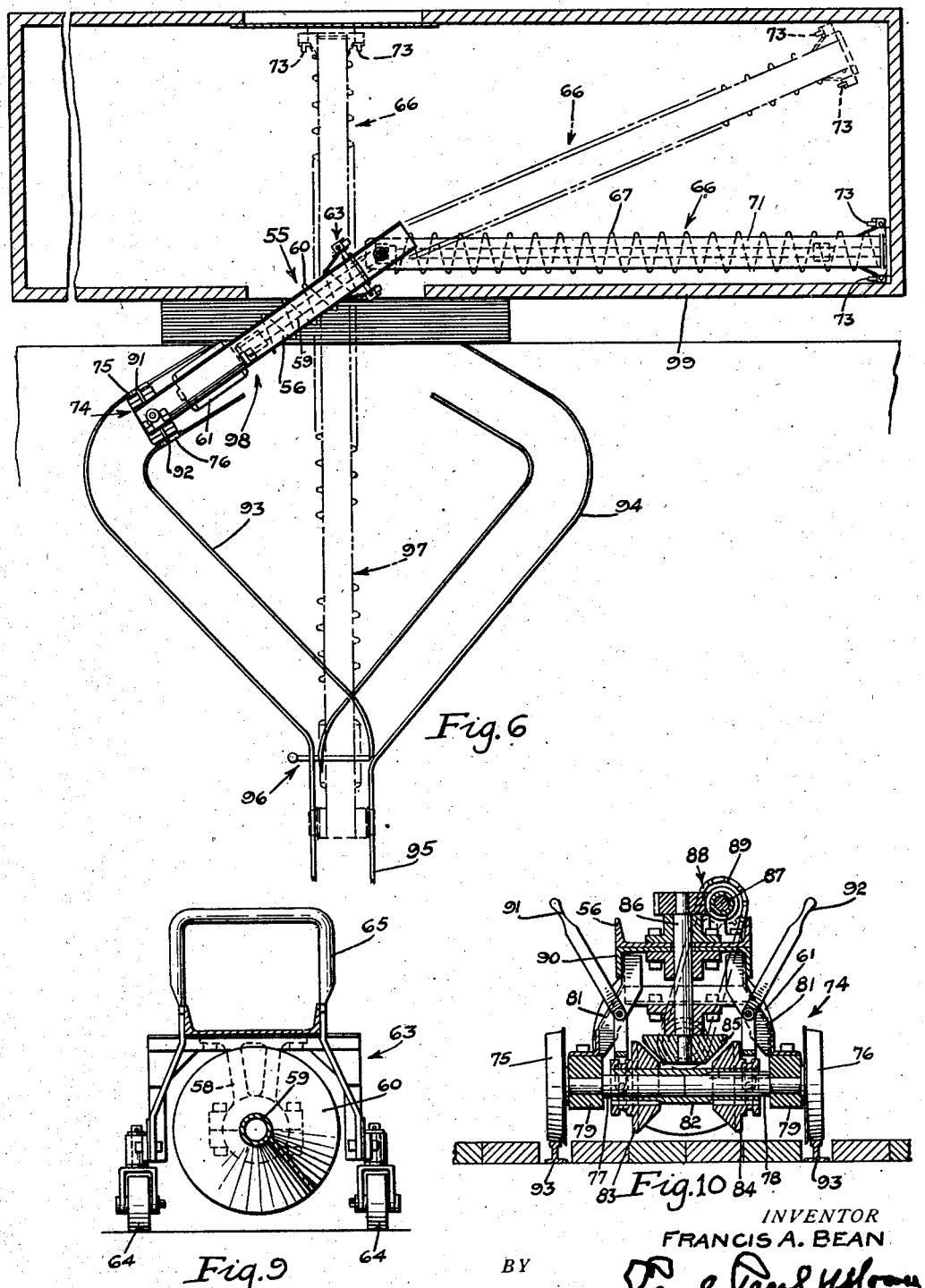
Figure 6 is a plan view showing a conveyer unit provided at one end with a power operated truck having flanged wheels adapted to travel upon suitable guide rails or tracks arranged adjacent to the freight car, and said conveyer unit being shown with an auxiliary conveyer unit coupled thereto.
Figure 9 is a cross-sectional view on the line 9—9 of Figure 8.
Figure 10 is a cross-sectional view on the line 10—10 of Figure 8.

The invention herein disclosed is shown in its simplest form in Figures 1 and 2, and comprises an open conveyer screw 2, comprising a shaft 3, one end of which is provided with a socket 4, of rectangular cross section, adapted to receive the squared terminal 5 of a suitable power device, generally indicated by the numeral 6. This power device is shown comprising a motor 7 which is directly connected to a suitable speed reducer 8, of which the shaft terminal 5 is a part. A suitable wheel 9 is provided at the opposite end of the conveyer 2 to provide a support therefor, and to prevent the conveyer from contacting directly with the floor of the car or bin.

In Figures 1 and 2, the power device 6 is shown pivotally supported upon an upright forked support 11 which, in turn, is mounted for pivotal movement upon a base plate 12 which may be suitably secured to a platform 13, as shown. As best illustrated in Figure 2, the platform 13 is disposed directly over a receiving bin 14, so that when a car 15 is positioned upon the tracks 16, as shown, the conveyer 2 may be inserted through the open door of the freight car into contact with the grain therein, whereby the latter may be quickly discharged from the car by the operation of the conveyer, as will be clearly understood by reference to Figure 2. The power device 6 is shown provided with suitable handles 17, whereby a workman may conveniently manipulate the conveyer, as shown in Figure 2.

When unloading freight cars, it may be desirable to lengthen the conveyer, whereby it may be extended into the remote corners of the car, as diagrammatically illustrated in Figure 4. To thus lengthen the conveyer, an auxiliary conveyer section 18 is coupled to the main conveyer section 2 by means of a suitable universal connection 19, it being noted that the shaft 3 of the main conveyer is provided with a squared terminal 21 adapted to be received in the coupling 19. The auxiliary conveyer section 18 is shown provided with a supporting wheel 22 to prevent its outer end from contacting directly with the floor or bottom of the car.

In the form shown in Figures 1 and 2, the base 12 of the power unit may be suitably secured to the platform if desired, by means of bolts or screws received in the apertures 23 provided in the base 12.

In Figures 3 and 4, there is shown a construction of slightly different form, in which the power unit 24 is mounted upon suitable swivel castors 25, cooperating with a wheel 26 to support the conveyer screw 27. Operating handles 28 are secured to the power device, whereby the apparatus may be conveniently moved about from place to place.

In Figure 4, the conveyer 27 is shown coupled to an auxiliary conveyer 18 similar to the one shown in Figure 1. It will also be noted in this figure, that the auxiliary conveyer 18 may be extended into the car in substantially parallel relation to the side walls thereof, whereby substantially all of the material in the car may be discharged therefrom by the conveyer screw.

In Figure 5, there is shown a conveyer 29 provided with a power device 31 mounted upon a suitable carriage 32 adapted for traveling movement upon suitable rails 33, shown disposed in parallel relation to the car 15. The power device 31 of the conveyer 29 is provided with operating handles 34, whereby the apparatus may be conveniently moved about when desired.

The apparatus, shown in Figures 1 to 5, inclusive, provides the utmost in simplicity. It is light in weight and is so constructed that it may be conveniently transported from one place to another and projected into a bin or a car, as shown in Figures 2 and 4. By grasping the handles of the power device, the conveyer may be conveniently moved about within the car or within the bin, and when the auxiliary conveyer section is coupled to the main conveyer 27, the apparatus may be extended into the remote corners of the car or bin, as above described, whereby all of the grain may be removed therefrom. When not in use, the apparatus may be conveniently transported to an out-of-the-way place, as it requires very little space for storage.

In Figures 6 to 10, inclusive, there is shown a conveying apparatus in which the power device is also utilized for propelling the apparatus. As shown in Figure 6, this apparatus comprises a power driven conveyer section, generally indicated by the numeral 55, and having a longitudinally extending frame member 56 provided with suitable bearing brackets or hangers 57 and 58, in which is supported the shaft 59 of a feed screw 60, as best shown in Figure 8. A suitable motor and speed reducer unit 61 is operatively connected to one end of the shaft 60 of the feed screw, and is supported on the frame member 56 by suitable bolts 62.

A suitable yoke, indicated generally by the numeral 63, is provided at one end of the apparatus and supports a pair of casters 64, as clearly shown in Figure 9. A suitable bail or handle member 65 is provided adjacent the yoke 63 for the convenience of an operator in guiding the apparatus about.

In order that substantially all of the grain in a box car may be removed therefrom by the conveying apparatus, a complemental conveyer section 66, having a feed screw 67 provided with a shaft 68, is operatively connected to the shaft 59 of the feed screw 60 by a universal connection 69, as shown in Figure 8. The supporting frame 71 of the complemental conveyer section 66 is pivotally connected to the frame member 56 of the conveyer section 55 by a suitable pivot 72, whereby the conveyer section 66 may be oscillated in a horizontal plane relatively to the conveyer section 55, as clearly illustrated by the full and broken lines in Figure 6. The outer or swinging end of the conveyer section 66 is provided with suitable casters 73, whereby it may readily be moved about upon the floor of the car to reach the remote corners thereof.

An important feature of the structure shown in Figures 6 to 10, inclusive, resides in the means provided whereby the conveyer sections 55 and 66 may be propelled by the power of the motor 61. To thus propel the apparatus, the conveyer section 55 is provided at one end with a power-operated truck, indicated generally by the numeral 74, and comprising a pair of flanged wheels 75 and 76 mounted upon suitable stub shafts 77 and 78, respectively. These shafts are supported in suitable bearings 79 provided at the lower portions of a pair of frame members 81. The shaft 78 is shown provided with a sleeve 82 which is slidably, but non-rotatably mounted thereon, and fits over the adjacent end of the shaft 77. A pair of friction cones 83 and 84 are secured to the sleeve 82 adjacent the ends thereof and are movable therewith.

A driving cone 85 is secured to the lower end of an upright shaft 86, mounted in suitable bearings provided in the frame of the apparatus. This cone is adapted to frictionally engage the complemental cones 83 and 84 to thereby propel the apparatus. The upper end of the shaft 86 is operatively connected to one end of a suitable drive shaft 87 by a suitable worm gear drive 88. The opposite end of the drive shaft 87 is shown having a chain 89 operatively connecting it to the shaft of the motor and speed reducer unit 81, or it may be connected directly to the shaft 59 of the feed screw 60, so that when said feed screw is operated, the drive shaft 87 will also be rotated.

The means for controlling the movement of the friction cones 83 and 84 is shown as consisting of a pair of levers 91 and 92, pivoted to the frame members 81 and having forked arms operatively connecting them to the hubs of the cones 83 and 84, as will be clearly understood by reference to Figure 10. In this figure, the cones 83 and 84 are shown in neutral position, wherein they are out of driving engagement with the drive cone 85. Because of the cones 83 and 84 being fixed to the sleeve 82, said cones may be selectively moved into frictional driving engagement with the drive cone 85, by manipulation of either of the levers 91 or 92, whereby the apparatus may be propelled in either direction. In Figure 10, I have shown two control levers so that the apparatus may be conveniently operated from either side. The upper ends of the side frame members 81 are secured to a cross member 90, which serves as a fifth wheel, and through which the upright shaft 86 passes. The shaft 86, in addition to transmitting power from the shaft 87 to the cones 83 and 84, also serves as a king pin, and cooperates with the fifth wheel member 90 to permit turning movement of the apparatus.

Means is provided for guiding the power driven conveyer section 55, when moving it into and out of a car door, as shown in Figure 6. Such means may consist of two sets of rails or tracks 93 and 94 upon which the flanged wheels 75 and 76 of the truck 74 travel. The ends of the tracks 93 and 94 adjacent to the car are preferably shaped as shown, and their opposite ends converge to a single track section 95. A suitable switch 96 is provided at the juncture of the track sections 93 and 94 for selectively guiding the truck 74 of the apparatus onto said rails.

The broken lines, indicated by the numeral 97, represent the alined positions of the conveyer sections 55 and 66, when the section 66 is initially moved into the car to commence the unloading of bulk material therefrom. By means of the guide tracks or rails 93 and 94, the power driven conveyer section 55 may be guided from the broken line position, shown at 97, to the full line position, shown at 98, wherein it will be noted that the pivoted conveyer section 66 may be moved to a position substantially parallel to the wall 99 of the car, whereby substantially all of the grain at that side of the car may be removed therefrom. Because of the pivotal connection between the conveyer sections 55 and 66, the latter section may readily be moved about within the car, as indicated by the broken lines in Figure 6, so that practically all of the grain may be removed from the car substantially without manual labor. The opposite end of the car may be unloaded in the same manner by switching the power driven conveyer section 55 onto the rails 94 and moving the pivoted section 66 into the opposite end of the car.

The apparatus, in its simplest form, as shown in Figures 1 to 5, inclusive, may readily be moved about and projected through the open door of a freight car, as shown in Figure 2, and by connecting the auxiliary conveyer section 18 to the main section 2, the conveyer may be extended into remote corners of the car, as hereinbefore stated.

By means of the tracks 93 and 94, shown in Figure 6, and by pivotally supporting one end of the main conveyer 55 upon the power operated truck 74, the auxiliary conveyer 66 may readily be guided into the car, as indicated by the full and dotted lines in Figure 6. The casters 64 of the main conveyer 55 permit the adjacent end of the conveyer to be readily moved about independently of the truck 74, the conveyer swinging relatively thereto about the axis of the upright shaft 86. The cones 83, 84, and 85 provide means whereby the apparatus may be propelled in either direction by the power of the motor and speed reducer unit 61, whereby no manual labor is required to operate the apparatus and to unload the grain from the car. The apparatus is very simple and inexpensive and has been found very practical and efficient in the operation of unloading bulk grain or other similar materials from box cars or bins.

Suitable means, not shown in the drawings, may be provided upon the various conveyer units herein shown, whereby suitable lifting cables or chains may be conveniently attached thereto, to thereby facilitate moving or transporting the units, particularly when moving them from one elevation to another, as when placing the unit in a loaded bin or grain car.

I claim as my invention:

1. In a portable conveyer unit, a longitudinally extending frame supported upon suitable trucks, a screw conveyer mounted beneath said frame, a motor for driving said screw, a complemental conveyer section pivotally connected to said power driven section and comprising a feed screw having a universal driving connection with said power driven screw, and means for operatively connecting one of said trucks to the motor whereby the apparatus may be power propelled.

2. In a portable conveyer, an elongated frame supported at its ends upon suitable trucks, a screw conveyer mounted beneath said frame and extending lengthwise thereof, a motor for driving said screw, and means for operatively connecting one of said trucks to the motor whereby the apparatus may be power propelled.

3. In a portable power propelled conveyer unit, a longitudinal frame a spiral feed screw mounted beneath said frame in spaced relation to the floor, wheeled trucks for supporting said frame, and whereby the conveyer may be conveniently transported, a motor for driving said feed screw, a friction drive for operatively connecting the wheels of one of said trucks to said motor, and whereby the unit may be power propelled in either direction, and means whereby an auxiliary screw conveyer may be connected to said spiral feed screw.

4. In a portable power propelled conveyer, a frame, a spiral feed screw mounted beneath said frame in spaced relation to the floor, wheeled trucks for supporting said frame, and whereby the conveyer may be conveniently transported, a motor for driving said feed screw, means for operatively connecting one of said trucks to the motor to propel the unit, and means for permitting relative pivotal movement of said power driven truck to allow turning movement of the conveyer unit.

FRANCIS A. BEAN.